United States Patent [19]

Patel et al.

[11] Patent Number: 5,712,614
[45] Date of Patent: Jan. 27, 1998

[54] POWER LINE COMMUNICATIONS SYSTEM

[75] Inventors: Chandrakant Bhailalbhai Patel, Hopewell; Jack Rudy Harford, Flemington, both of N.J.; Stephen Pudles, Longwood, Fla.; Joseph Robert Ader, Yardley, Pa.

[73] Assignee: Elcom Technologies Corporation, Malvern, Pa.

[21] Appl. No.: 437,844

[22] Filed: May 9, 1995

[51] Int. Cl.⁶ .................................................. H04M 11/04
[52] U.S. Cl. ........................... 340/310.03; 340/310.01; 340/310.08; 348/6; 348/8; 455/3.3; 455/4.2
[58] Field of Search .............. 340/310.01, 310.02, 340/310.03, 310.06, 310.08; 348/6, 8; 455/3.3, 4.2

[56] References Cited

U.S. PATENT DOCUMENTS

| 1,717,062 | 6/1929 | Phelps | 340/310.02 |
|---|---|---|---|
| 4,367,557 | 1/1983 | Stern et al. | 340/310.01 |
| 4,538,136 | 8/1985 | Drabing | 340/310.02 |
| 4,644,321 | 2/1987 | Kennon | 340/310.02 |
| 4,772,870 | 9/1988 | Reyes | 340/310.02 |
| 4,847,903 | 7/1989 | Schotz | |
| 4,912,721 | 3/1990 | Pidgeon, Jr. et al. | 375/1 |
| 5,404,127 | 4/1995 | Lee et al. | 340/310.03 |
| 5,410,720 | 4/1995 | Osterman | 340/310.02 |

FOREIGN PATENT DOCUMENTS

WO 92/21194  11/1992  WIPO.

Primary Examiner—Jeffery Hofsass
Assistant Examiner—Nina Tong
Attorney, Agent, or Firm—Ratner & Prestia

[57] ABSTRACT

A power line communications system in which information signals are frequency multiplied in a transmitter unit, so that the critical information portions of the information signals are frequency shifted from a notch in the frequency response characteristic between an outlet in the power line communications system to which the transmitter unit is connected and an outlet in the power line communications system to which a receiver unit is connected, whereby the critical information portions of the information signals are not lost in the notch.

2 Claims, 5 Drawing Sheets

POWER LINE COMMUNICATIONS SYSTEM

TECHNICAL FIELD

The present invention relates, in general, to the communication of information and, in particular, to the transmission and reception of information signals along the power lines in a building.

BACKGROUND OF THE INVENTION

The lines by which power is distributed in a building can be and are used for the transmission of information signals between rooms within a building. Power lines can exhibit severe amplitude variations in the frequency bands used for power line communication. These amplitude variations are due to a number of factors such as unterminated (i.e. open) outlets, the number and type of units (e.g. lamps, appliances, heaters, etc.) which are plugged into the outlets, the cycling of certain units (e.g. heaters) which are plugged into the outlets, and the lengths of the power lines between the outlets.

When the power line communications system is used to transmit television signals, most of the amplitude variations are "dips" in the order of 10 dB to 20 dB which are spread over a few or more hundreds of kilohertz. Such "dips" can be tolerated in that the signals can be amplified to the extent necessary, or the subjective effects of these dips on the picture quality is acceptable.

However, at some frequencies, the attenuation can be in the order of 50 dB or 60 dB or even 70 dB and spread over less than 100 Khz. Such a sharp attenuation is called a "notch" or "suck-out." If critical signal information (e.g. the most important part for picture information of a television signal) happens to fall at a notch, it is highly attenuated and very difficult, if not impossible, to amplify to provide expected system performance.

For television signals, critical information is around the picture carrier. If such a notch is near the picture carrier, the circuitry by which information signal input of the television set is connected to the power line might not be able to provide the required gain (i.e. Automatic Gain Control), while maintaining the desired signal-to-noise (S/N) ratio in its output. It is possible that the circuitry in the television set connected to the power line might not be able to derive synchronizing information for satisfactory operation.

SUMMARY OF THE INVENTION

The present invention is directed to alleviating the effects of severe attenuation of signals carrying critical information in a power line communications system. A power line communications system, constructed in accordance with the present invention, includes first signal conducting means for supplying information signals over a first band of frequencies from an information signal source, a power line and a plurality of outlets individually connected to the power line, including a first outlet at which the information signals are transmitted and a second outlet at which the information signals are received. The information signals are conducted to the power line by a transmitter unit and are conducted from the power line by a receiver unit. The transmitter unit includes first oscillator means for supplying a first carrier signal, control means for controlling the oscillator means to set the first carrier signal at a first predetermined frequency dependent upon the frequency band of a notch in the frequency response characteristic of a first of the outlets to which the transmitter unit is intended to be connected, and first multiplier means for frequency multiplying the first carrier signal and the information signals to frequency shift the information signals to a second band of frequencies. The transmitter unit also includes second signal conducting means for conducting the information signals after frequency shifting by the first multiplier means to a first of the outlets for transmission of the information signals along the power line to a second of the outlets. A power line communications system, constructed in accordance with present invention, also includes a receiver unit which includes third signal conducting means for conducting the information signals from the second outlet, second oscillator means for supplying a second carrier signal having a second predetermined frequency, and second multiplier means for frequency multiplying the second carrier signal and the information signals conducted by the second conducting means to frequency shift the information signals conducted by the second signal conducting means to a band of frequencies at least approximately the same as the first band of frequencies. The receiver unit also includes fourth signal conducting means for conducting the information signals after frequency shifting by the second multiplier means to a utilization unit.

While the present invention will be described in connection with the transmission and reception of television signals, a power line communications system, constructed in accordance with the present invention, has broader application and can be used to transmit and receive other types of information signals (e.g. telephones, computers, etc.).

DETAILED DESCRIPTION OF THE INVENTION

Figure 1:
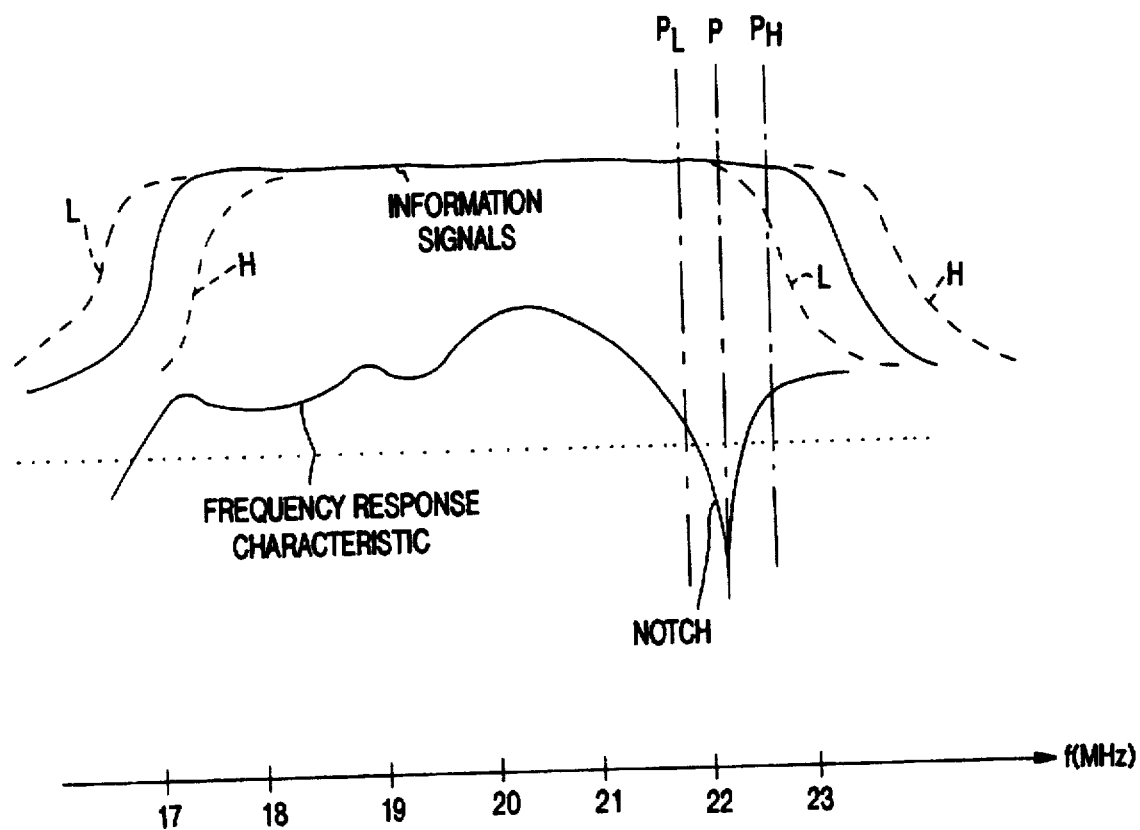
FIG. 1 shows a frequency response characteristic at an outlet of a power line communication system having a notch and modulated television signals transmitted along a power line to which the outlet is connected.

As indicated above, a frequency response characteristic, such as the one illustrated in FIG. 1, for an outlet in a power line communications system can result in the loss of the most important part of the information signal transmitted along the system and intended for reception by a utilization unit. The information signals received by the utilization unit are affected by the original transmitted signal and the characteristics of the power line communications system existing between a first outlet at which the information signals are transmitted along the power line and a second outlet at which the information signals are received. If the information signal is, for example, a television signal and the picture information portion centered at P of the television signal happens to fall at a NOTCH in the frequency response characteristic, the picture information portion of the television signal is highly attenuated and it is very difficult, if not impossible, to appropriately amplify the picture information portion of the television signal in the circuitry by which the utilization unit is connected to the power line, while maintaining the desired signal-to-noise (S/N) ratio and provide expected system performance. It is possible that the circuitry in a television set connected to the power line, might not be able to derive synchronizing information for satisfactory operation.

Figure 2:
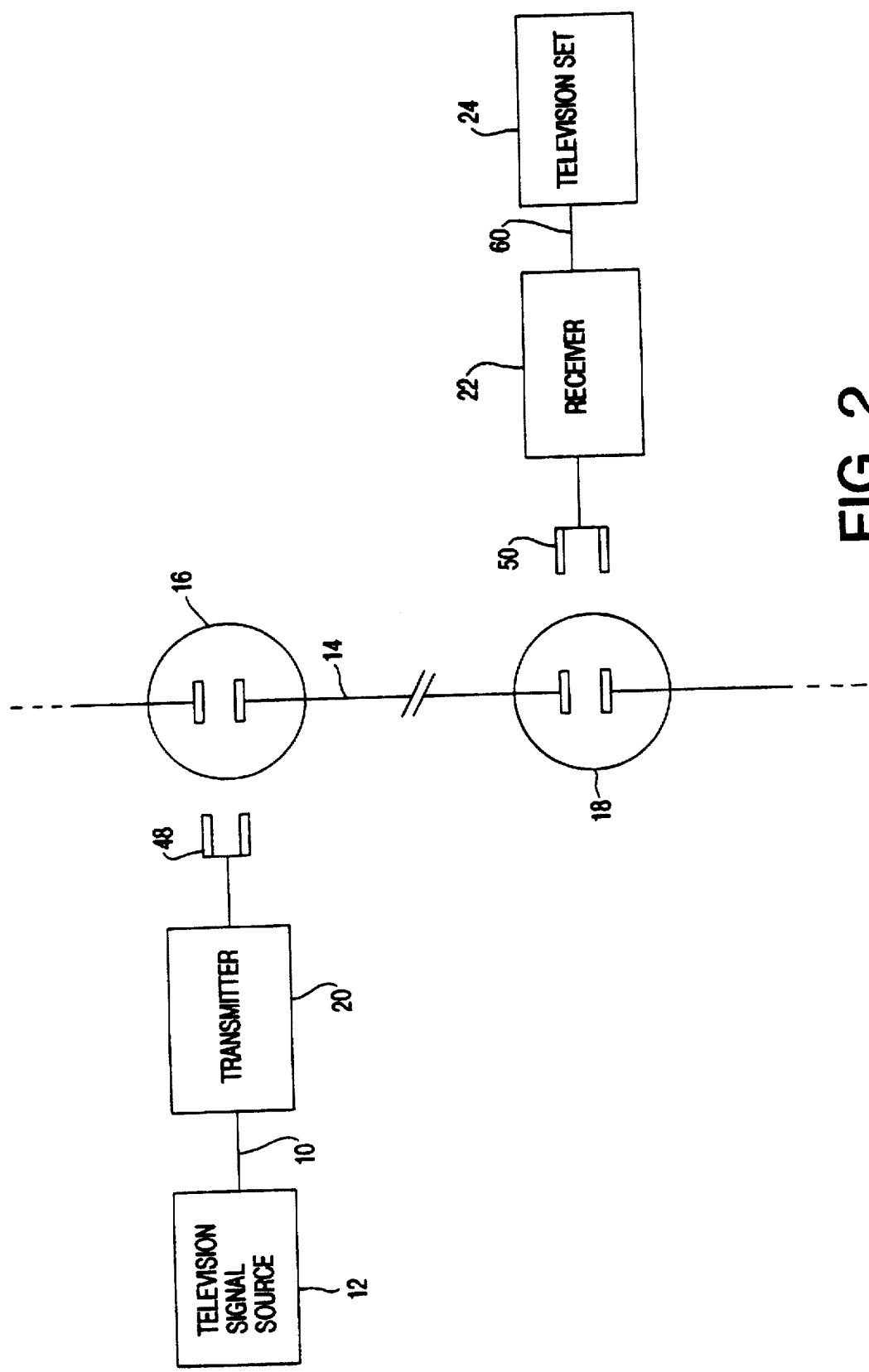
FIG. 2 is a block diagram of a power line communications system constructed in accordance with the present invention in which the effect of the notch in the frequency response characteristic of FIG. 1 is alleviated.

Referring to FIG. 2, a power line communications system, constructed in accordance with the present invention, includes first signal conducting means, represented by a line 10, for supplying information signals over a first band of frequencies from an information signal source, such as a television signal source 12 by which cable television signals are delivered to a building.

This power line communications system also includes a power line 14 and a plurality of outlets 16 and 18 individually connected to power line 10. The information signals are transmitted along the power line from outlet 16 and are received at outlet 18. These outlets may be connected directly by power line wires or may have circuit breakers or fuses in their path and may be on different phases of the power line.

As is well known, the reception and processing of television signals from a cable television connection box or a VCR requires selecting between channel 3 or channel 4 depending upon which of the two is not an active channel for the particular location. For a channel 3 setting of the power line communications system, the information signals supplied from cable television connection box 18 are, ideally, over a band from 60 Mhz to 66 Mhz. For a channel 4 setting of the power line communications system, the information signals supplied from cable television connection box 18 are, ideally, over a band from 66 Mhz to 72 Mhz.

The FIG. 2 power line communications system also includes a transmitter unit 20 and a receiver unit 22. Transmitter unit 20 receives the information signals and is adapted for connection to power line 14 to conduct the information signals to the power line. Receiver 22 also is adapted for connection to power line 14 and conducts the information signals to a utilization unit, such as a television set 24.

Figure 3:
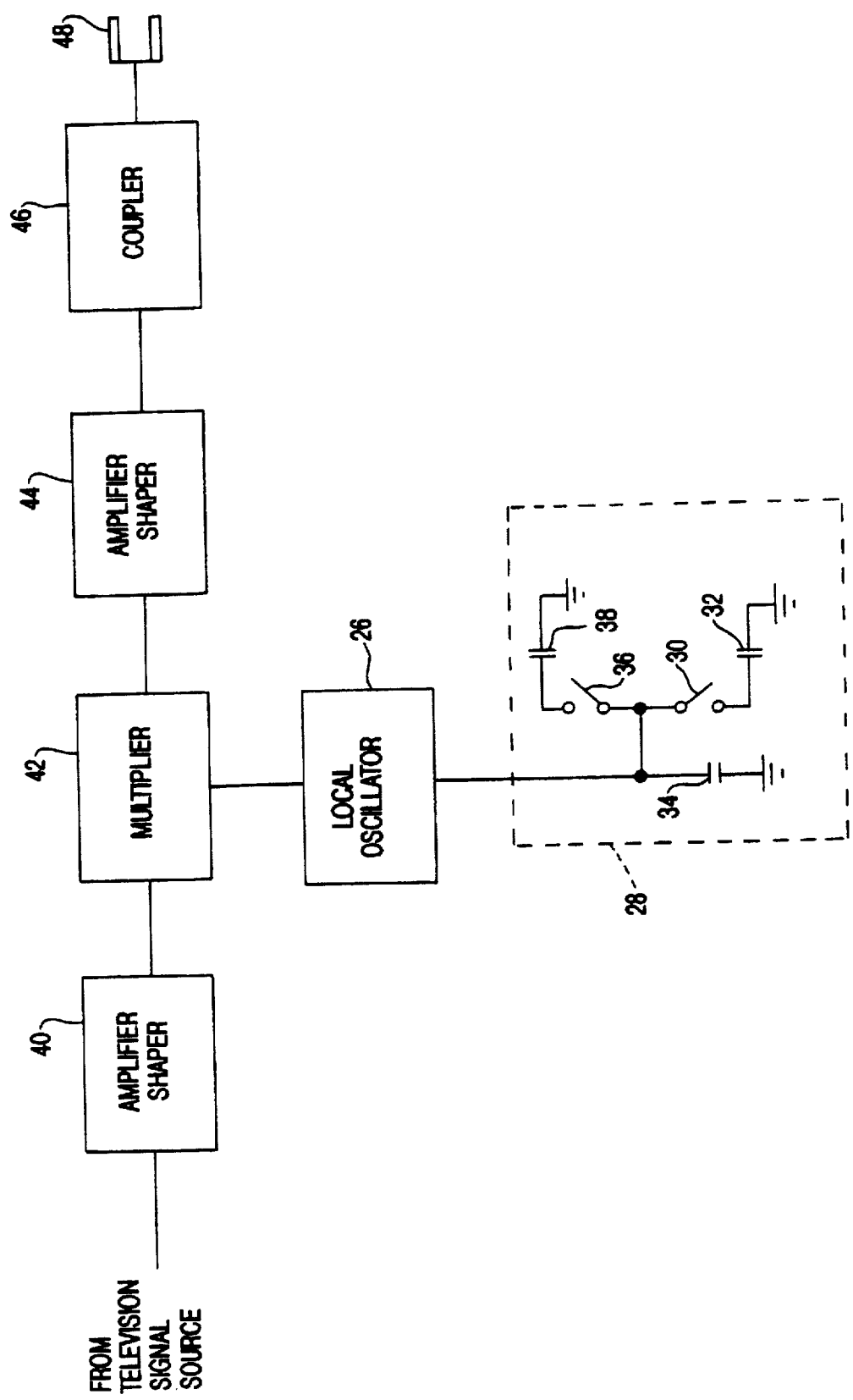
FIG. 3 is a block diagram of the transmitter unit portion of the FIG. 2 power line communications system of FIG. 2.

Referring to FIG. 3, transmitter unit 20 includes first local oscillator means 26 for supplying a first carrier signal and control means 28 for controlling first local oscillator means 26 to set the first carrier signal at a first predetermined frequency dependent upon the frequency band of a notch in the frequency response characteristic between a first of the outlets, namely outlet 16 to which transmitter unit 20 is intended to be connected, and a second of the outlets, namely outlet 18 to which receiver unit 22 is intended to be connected. Control means 28 can be in the form of a capacitor/switching network such as the one shown in FIG. 3. For the transmission and reception of television signals, a first switch 30 and a first capacitor 32 serve to select between channel 3 or channel 4 operation. For a channel 3 setting of the power line communications system, with switch 30 closed and capacitor 32 placed in parallel with a second capacitor 34, the first carrier signal supplied by first local oscillator means 26 can be 83 Mhz. For a channel 4 setting of the power line communications system, with switch 30 open and capacitor 32 out of the network, the first carrier signal supplied by first local oscillator means can be 89 Mhz. A second switch 36 and a third capacitor 38 serve to alleviate, as will be explained below, the effects of a notch in the frequency characteristic between outlet 16 to which transmitter unit 20 is adapted for connection and outlet 18 to which receiver unit 22 is adapted for connection.

Preferably, transmitter unit 20 includes first amplifier and shaper means 40 for amplifying and shaping the information signals supplied by television signal source 12. Signals outside the range of frequencies of the information signals (e.g. 60 Mhz to 72 Mhz for television signals) are attenuated by amplifier and shaper means 40.

Transmitter unit 20 also includes first multiplier means 42 for frequency multiplying the first carrier signal supplied by first local oscillator means 26 and the information signals (e.g. either in the channel 3 band or the channel 4 band for television signals) to frequency shift the information signals to a second band of frequencies selected for power line transmission. This is shown in FIG. 1 by the 6 Mhz band of the information signals extending between, for example, 17 Mhz and 23 Mhz. The amount of frequency shifting of the information signals is selected so that the frequencies of the information signals are below the 40 Mhz upper limit of operation of power line communication systems set by the government.

For the conditions illustrated by the solid line curves of the INFORMATION SIGNALS and the FREQUENCY RESPONSE CHARACTERISTIC in FIG. 1, picture information portion P of the television signal, extending over a band of approximately 500 KHZ, falls at a NOTCH in the FREQUENCY RESPONSE CHARACTERISTIC which extends below an acceptable level illustrated by the dotted line. Those portions of the television signal, specifically the picture information portion P, falling within the band defined by where the dotted line crosses the FREQUENCY RESPONSE CHARACTERISTIC are likely to be lost due to severe attenuation.

To alleviate this problem, switch 36 in FIG. 3 is closed and capacitor 38 is placed in parallel with capacitor 34. This changes the frequency of the first carrier signal supplied by first local oscillator means 26 a few hundreds of kilohertz, for example 300 KHz, to either 83.3 Mhz or 82.7 MHz for a channel 3 setting of switch 30 or 89.3 Mhz or 88.7 MHz for a channel 4 setting of switch 30. As indicated by the dashed line curves L—L and H—H in FIG. 1, this results in a different frequency shift of the television signal supplied to first multiplier means 42. Curve L—L corresponds to the "low" product of multiplication by first multiplier means 42 and extends between approximately 16.70 Mhz and approximately 22.70 Mhz with $P_L$, corresponding to the picture information portion P of the television signal, above where the dotted line crosses the FREQUENCY RESPONSE CHARACTERISTIC. Curve H—H corresponds to the "high" product of multiplication by first multiplier means 42 and extends between approximately 17.20 Mhz and approximately 23.20 Mhz with $P_H$, corresponding to the picture information portion P of the television signal, above where the dotted line crosses the FREQUENCY RESPONSE CHARACTERISTIC. One or the other of the products of the multiplication by multiplier means 42 can be used for the particular power line communications system.

Preferably, transmitter unit 20 includes second amplifier and shaper means 44 for amplifying and shaping the information signals after frequency shifting of the information signals by first multiplier means 42 and first coupler means 46 which provide filtering, isolation and impedance matching.

Transmitter unit 20 also includes second signal conducting means, in the form of a plug 48, for conducting to outlet 16 the information signals coupled to plug 48 after frequency shifting by first multiplier means 42 and amplifying and shaping of the information signals by first amplifier and shaper means 44. The information signals conducted to outlet 16 are transmitted along power line 14 to outlet 18.

Figure 4:
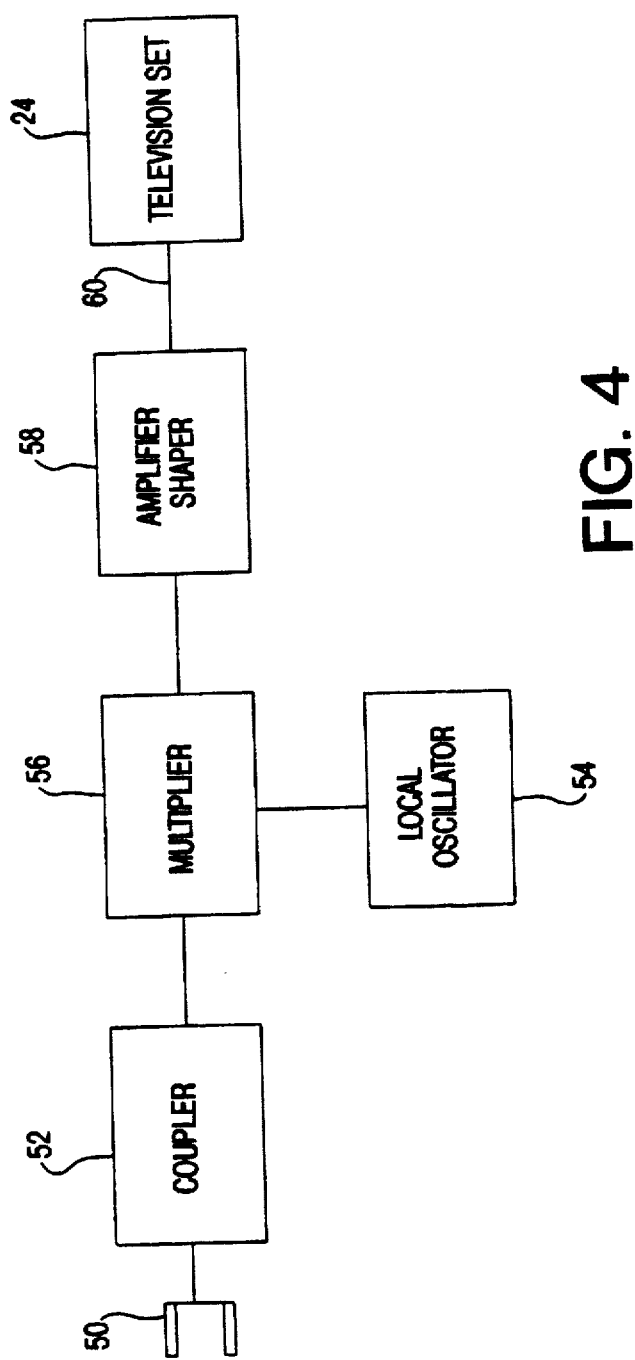
FIG. 4 is a block diagram of the receiver unit portion of the FIG. 2 power line communications system of FIG. 2.

Referring to FIG. 4, receiver unit 22 includes third signal conducting means, in the form of a plug 50, for conducting the information signals from outlet 18. Preferably, receiver unit 22 includes second coupler means 52 which provide isolation, impedance matching, and filtering.

Receiver unit 22 also includes second local oscillator means 54 for supplying a second carrier signal having a second predetermined frequency and second multiplier means 56 for frequency multiplying the second carrier signal and the information signals conducted by plug 50 to frequency shift the information signals conducted by plug 50 to a band of frequencies at least approximately the same as the first band of frequencies. With the utilization unit (e.g. a television set) arranged to receive information signals over a specific band of frequencies (e.g. 60 Mhz to 66 Mhz for channel 3 or 66 Mhz to 72 Mhz for channel 4), the information signals must be returned, from the frequency band over which the information signals are transmitted and received by the power line communications system, to at least approximately the frequency band at which they can be used by the utilization equipment. Second local oscillator means 54 is arranged to provide a second carrier signal having the requisite frequency such that, when the second carrier signal is multiplied with the information signals by second multiplier means 56, the information signals are frequency shifted to the requisite band of frequencies. For a television signal, second local oscillator means 54 is set to supply either one of two carrier signals corresponding to either channel 3 operation or channel 4 operation. To the extent that the frequency shifting of the information signals in the transmitter unit 20 has been influenced by switch 36 being closed to alleviate the effects of a NOTCH in the frequency response characteristic, the second band of frequencies of the output of second multiplier means 56 will be only approximately the same as the first band of frequencies of the information signals supplied to transmitter unit 20. However, television set 24 can accommodate television signals having portions outside the prescribed 6 Mhz band for a particular channel.

Preferably, receiver unit 22 includes second amplifier and shaper means 58 for amplifying and shaping the information signals after frequency shifting of the information signals by second multiplier means 56.

Receiver unit 22 also includes fourth signal conducting means, represented by a line 60, for conducting to a utilization unit the information signals after frequency shifting by second multiplier means 56 and amplifying and shaping of the information signals by third amplifier and shaper means 58.

Figure 5:
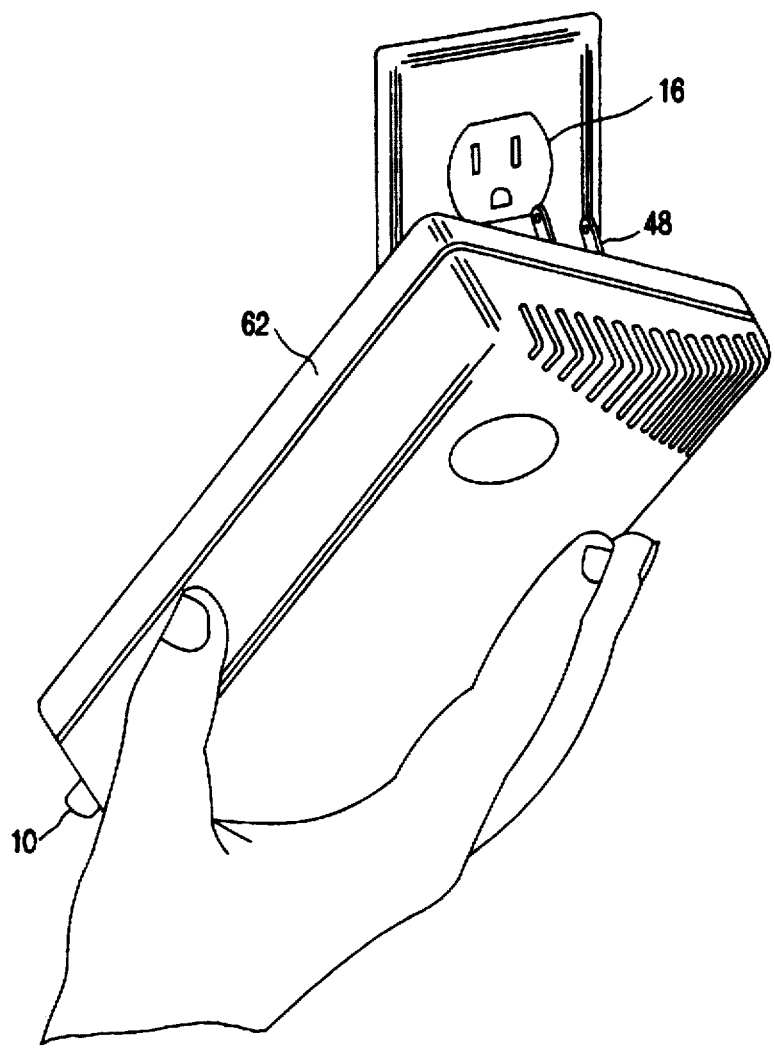
FIG. 5 is a perspective view of the housing which contains either the FIG. 3 transmitter unit or the FIG. 4 receiver unit as the housing is being plugged into an outlet.

The components of transmitter unit 20, namely first local oscillator means 26, control means 28, first amplifier and shaper means 40, first multiplier means 42, second amplifier and shaper means 44, and first coupler means 46 can be arranged in a housing 62, such as the one shown in FIG. 5. Plug 48, by which transmitter unit 22 is connected to outlet 16, and connector 10, by which information signals from an information signal source are supplied to the transmitter unit, are fixed to and extend from housing 62. The components of receiver unit 22 can be arranged in a similar housing with plug 50 and connector 60 fixed to and extending from the housing.

As indicated above, the present invention has application for communication of information signals other than television. For example, a power line communications system, constructed in accordance with the present invention, can be used to transmit and receive telephone signals. For telephone signals, the entire audio signal can get lost in a notch because the audio frequency band is relatively narrow.

Because telephony involves two-way communication, both the location at which the telephone signal enters the power line and the location of an extension have a transmitter/receiver unit which is a combination of the transmitter unit of FIG. 3 and the receiver unit of FIG. 4. If the notch switch in the transmitter/receiver unit at the location at which the telephone signal enters the building is closed, the notch switch in the transmitter/receiver unit at the location of an extension also must be closed. Typical carrier frequencies for the local oscillators are 5.5 Mhz and 6.5 Mhz, one for each direction of transmission.

While in the foregoing there have been described preferred embodiments of the present invention, it should be understood by those skilled in the art that various modifications and changes can be made without departing from the true spirit and scope of the present invention.

What is claimed:

1. A power line communications system comprising:
   first signal conducting means for supplying television signals over a first band of frequencies from a television signal source;
   a power line;
   a plurality of outlets individually connected to said power line, including a first outlet at which said television signals are transmitted and a second outlet at which said television signals are received;
   a transmitter unit connected to said first outlet and including:
   (a) first amplifier and shaper means for amplifying and shaping said television signals supplied by said first signal conducting means from the television signal source,
   (b) first oscillator means for supplying a first carrier signal,
   (c) control means for controlling said first oscillator means to set said first carrier signal at a first predetermined frequency dependent upon a frequency band of a notch in a frequency response characteristic between said first and said second outlets, said control means including:
      (1) a first switch for controlling said first oscillator means to selectively set said first carrier signal at said first predetermined frequency dependent upon channel 3 or channel 4, operation of a television set to which said television signals are supplied, and
      (2) a second switch for controlling said first oscillator means to selectively set said first carrier signal at said first predetermined frequency if said frequency response characteristic between said first outlet and said second outlet has a notch,
   (d) first multiplier means for frequency multiplying said first carrier signal and said television signals to frequency shift said television signals to a second band of frequencies,
   (e) second amplifier and shaper means for amplifying and shaping said television signals after frequency shifting of said television signals by said multiplier means,
   (f) second signal conducting means for conducting said television signals after frequency shifting by said first multiplier means and amplifying and shaping of said television signals by said second amplifier and shaper means to said first outlet for transmission of said television signals along said power line to said second outlet, and (g) first coupler means for coupling said television signals to said second signal conducting means after amplifying and shaping of said television signals by said second amplifier and shaper means; and a receiver unit connected to said second outlet and including:

(a) third signal conducting means for conducting said television signals from said second outlet, (b) second oscillator means for supplying a second carrier signal having a second predetermined frequency, (c) second multiplier means for frequency multiplying said second carrier signal and said television signals conducted by said third signal conducting means to frequency shift said television signals conducted by said third signal conducting means to a band of frequencies at least approximately the same as said first band of frequencies, (d) second coupler means for coupling said television signals conducted by said third signal conducting means to said second multiplier means, (e) third amplifier and shaper means for amplifying and shaping said television signals after frequency shifting of said television signals by said second multiplier means, and (f) fourth signal conducting means for conducting said television signals after frequency shifting of said television signals by said second multiplier means and amplifying and shaping of said television signals by said third amplifier and shaper means to a television set.

2. A transmitter unit for a power line communications system comprising:

first signal conducting means for supplying television signals over a first band of frequencies from a television signal source;

first amplifier and shaper means for amplifying and shaping said television signals supplied by said first signal conducting means from the television signal source;

local oscillator means for supplying a carrier signal;

control means for controlling said local oscillator means to set said carrier signal at a predetermined frequency dependent upon a frequency band of a notch in a frequency response characteristic between a first outlet in the power line communications system to which the transmitter unit is adapted for connection and a second outlet in the power line communications system to which a receiver unit is adapted for connection, said control means including:

(a) a first switch for controlling said local oscillator means to selectively set said carrier signal at said predetermined frequency dependent upon channel 3 or channel 4 operation of a television set to which said television signals are supplied, and (b) a second switch for controlling said local oscillator means to selectively set said carrier signal at said predetermined frequency if said frequency response characteristic between the first outlet in the power line communications system to which the transmitter unit is adapted for connection and the second outlet in the power line communications system to which the receiver unit is adapted for connection has a notch;

multiplier means for frequency multiplying said carrier signal and said television signals to frequency shift said television signals to a second band of frequencies;

second amplifier and shaper means for amplifying and shaping said television signals after frequency shifting of said television signals by said multiplier means;

second signal conducting means for conducting said television signals after frequency shifting of said television signals by said multiplier means and amplifying and shaping of said television signals by said second amplifier and shaper means to the first outlet in the power line communications system for transmission of said television signals along a power line in the power line communications system to the second outlet in the power line communications system; and coupler means for coupling said television signals to said second signal conducting means after frequency shifting of said television signals by said multiplier means and amplifying and shaping of said television signals by said second amplifier and shaper means.

* * * * *